Feb. 16, 1960     S. EIDENSOHN ET AL     2,925,455
CONTINUOUS FEED PRIMARY BATTERY SYSTEM
Filed Dec. 18, 1956
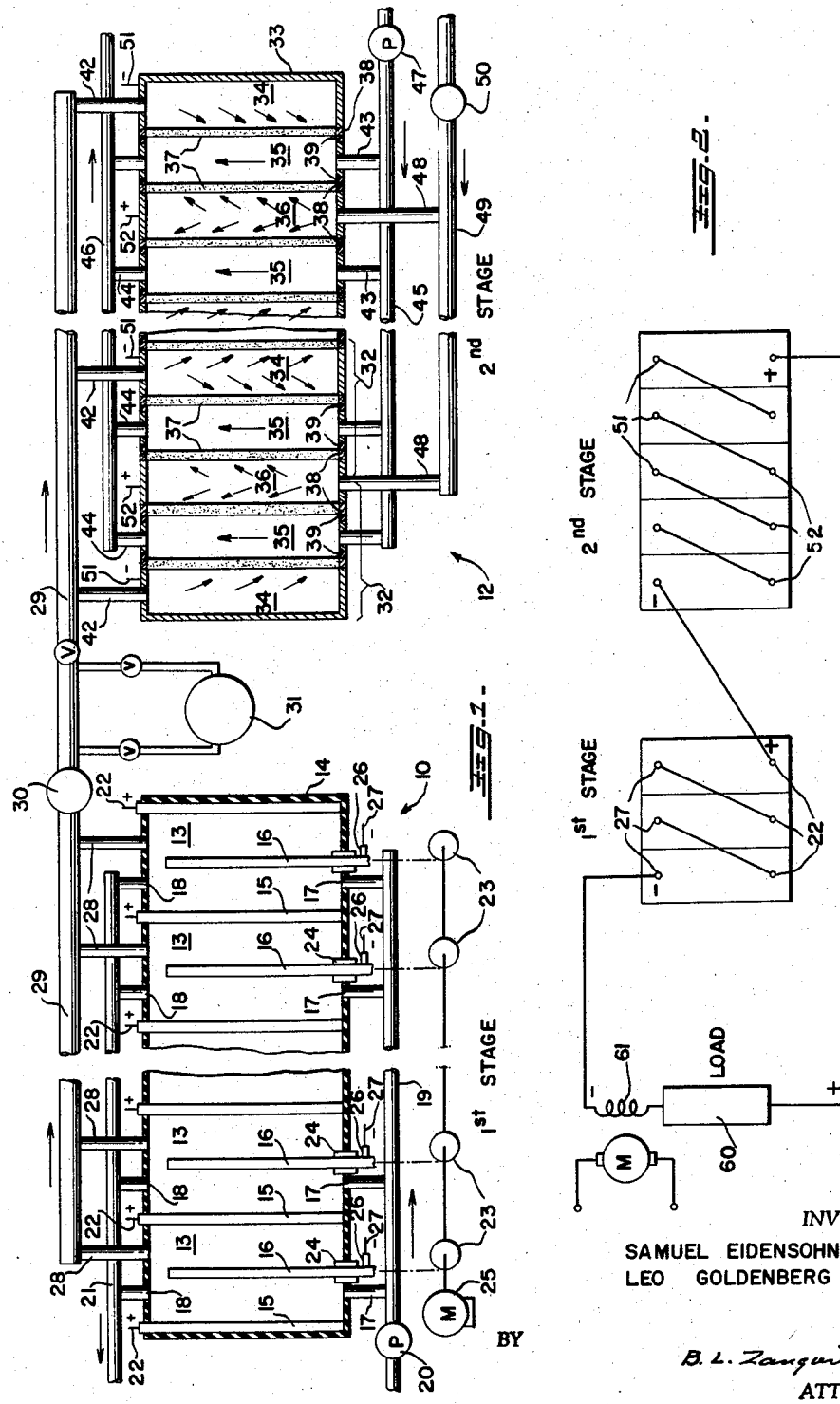
INVENTORS
SAMUEL EIDENSOHN
LEO GOLDENBERG
BY
*B. L. Zangwill*
ATTORNEYS United States Patent Office 2,925,455
Patented Feb. 16, 1960

2,925,455
CONTINUOUS FEED PRIMARY BATTERY SYSTEM

Samuel Eidensohn, Washington, D.C., and Leo Goldenberg, Silver Spring, Md.

Application December 18, 1956, Serial No. 629,199

11 Claims. (Cl. 136—86)

(Granted under Title 35, U.S. Code (1952), sec. 266)

The invention described herein may be manufactured and used by or for the Government of the United States for governmental purposes without the payment of any royalties thereon or therefore.

This invention relates to a continuous-feed two stage primary battery system wherein electrical power may be taken from both stages and combined to give a power system of a desired voltage and current; and particularly a two stage primary battery system wherein the chemical products of the first stage are utilized in the second stage as a reactant; and specifically to a two stage primary battery system having means in the first stage which supplies the anode reactant for both stages.

Primary batteries of the prior art are single stage systems, and among them are those wherein a sacrificial anode is employed or wherein two gases, e.g. hydrogen and oxygen, are electrochemically reacted. The former suffers the disadvantage of poor efficiency in that the chemical products of the electrochemical reaction are dissipated and wasted. The latter generally require plant installations of excessive weight due to the need for storing the reactant gases under pressure in heavy containers.

In the instant invention a first stage is provided wherein the electrochemical reaction of an active metal with water continuously generates electrical energy, and at the same time generates a gas which is used as a reactant in a second stage to produce additional electrical energy.

Briefly then, this invention is directed to a process and apparatus for a continuous-feed two stage primary battery system for the derivation of electrical energy both from the electrochemical reaction of a strongly electropositive metal in a first stage and from the electrochemical reaction of the gaseous products thereof in a second stage with a gas supplied to the second stage. In effect it is the anode reactant of the first stage which electrochemically reacts with the cathode reactant of the second stage to produce electrical energy.

An object therefore is to provide a continuous-feed two stage primary battery system.

Another object of the invention is the provision of a two stage primary battery system wherein the anode reactant of the first stage also supplies the anodic reactant for the second stage.

Another object is the provision of a two stage primary battery system wherein electrical energy is derived from both stages.

Still another object of the invention is the provision of a two stage primary battery system wherein the gaseous products of the electrochemical reaction of the anodic material in the first stage are employed as the anodic reactant in the second stage.

A further object of the invention is the provision of an efficient primary battery system wherein an electropositive metal is reacted with a gas to generate useful electrical energy.

A still further object of the invention is the provision of a process for deriving direct current electrical energy whereby maximum use is made of the materials employed.

Other objects and many of the attendant advantages of this invention will be readily appreciated as the same becomes better understood by reference to the following details and descriptions when considered in connection with the accompanying drawings, in which:

Fig. 1 is an overall plan view, partially in diagrammatic cross section, of the two stage primary battery system of the invention.

Fig. 2 is a schematic diagram showing a series connection between the two stages, whereby their electrical outputs are combined.

Referring now to the drawings, wherein like reference characters designate like or corresponding parts throughout the several views, there is shown in Fig. 1 a first stage primary battery, generally designated by reference 10, functionally and electrically connected (Fig. 2) to a second stage primary battery, generally designated by 12.

The first stage 10 comprises a plurality of cells 13 in a casing 14 of any suitable shape and composed of any suitable insulating material such as hard rubber. Each of the cells 13 comprises a chemically inert cathode 15 and strongly electropositive metal anode 16. In a specific embodiment carbon (or graphite on which may be deposited a platinum catalyst) cathodes, and magnesium anodes are employed, though aluminum or alloys of the two metals are also suitable as anodes.

The casing 14 in the vicinity of each of the cells 13 is perforated on opposite sides, whereby inlet conduits 17 and outlet conduits 18 are inserted in fluid tight relationship therewith. An inlet main 19, having therein a driven circulating pump 20, and an outlet main 21 are connected to inlet and outlet conduits 17 and 18 whereby an electrolyte may be circulated, continuously or intermittently, through each of the cells 13 in stage 10. In a specific embodiment, sea water has been found suitable as an electrolyte. Each of the carbon cathodes 15 is connected to a positive terminal 22 sealed in the wall of casing 14 in conventional manner. The magnesium anodes 16 in each cell are fed at speeds proportional to current requirements from sheet rolls 23 through suitable fluidtight glands 24 under control of a D.C. motor 25 or the like. Electrical terminal connections 27 from the magnesium anodes 16 are made through brushes 26 or the like.

As is understood, when terminals 22 and 27 connected to the carbon cathodes 15 and magnesium anodes 16 respectively, are externally connected, and the electrolyte is circulated through each cell 13, the magnesium anode will react with the electrolyte to liberate electrons, thereby causing a current to flow in the external circuit, and to liberate hydrogen gas. It is this hydrogen gas which is dissipated in the prior-art batteries.

As seen in Fig. 1, the hydrogen gas produced in each cell 13 is directed through outlet conduits 28 to a hydrogen line 29, compressed in a compressor 30 and fed to the second stage primary battery 12 in the system. The hydrogen may be fed directly to the second stage, or, alternatively after compression, fed to the second stage at a uniform controlled rate from transitory storage in an accumulator 31.

The second stage 12 comprises essentially a plurality of hydrogen-oxygen continuous feed primary battery cells 32, the nature and operation of which are known to the art and which per se do not form part of the instant invention. Briefly, however, the second stage comprises a steel casing 33, cylindrical in shape, divided into a plurality of compartments; hydrogen compartments 34, electrolyte compartments 35, and oxygen compartments 36, The walls 37 of said plurality of compartments are discs and, except for the ends of the cylindrical casing 33, are composed of a porous chemically inert metal, preferably nickel. The peripheral edges 38 of the circular walls or discs are non-porous and are held in gas and fluid tight relationship by the cylindrical walls of the steel casing 33. The sides of the walls 37 facing the electrolyte compartments 35 are insulated from the steel casing 33, as by insulation 39, whereby the hydrogen anodes and oxygen cathodes or compartments 34 and 36 are insulated from one another. It is understood that the casing sections abutting walls 37 are suitably secured together as by insulated bolts or the like, not shown.

As seen in Fig. 1 hydrogen under pressure from line 29 enters compartments 34 through hydrogen inlets 42 connected between line 29 and the compartments. An electrolyte enters and leaves compartments 35 via inlet conduits 43 and outlet conduits 44, connected respectively to an electrolyte inlet main 45 and outlet main 46. Inlet main 45 is further provided with a driven circulating pump 47 whereby the electrolyte, preferably sea water or the like is continuously renewed in the cells 32. As further seen in Fig. 1, oxygen enters the compartments 36 under pressure through inlets 48 connected to an oxygen main 49 containing a driven compressor 50. In a specific embodiment shown, atmospheric air is fed into compartments 36, the oxygen content thereof being sufficient for the reaction. Positive and negative terminals 51 and 52 are electrically secured to the steel casing 33, housing the hydrogen and oxygen compartments respectively, whereby the electrical energy generated by the electrochemical combination of the gases may be tapped.

In operation, hydrogen and electrical energy are produced in the first stage 10 through the electrochemical reaction between the magnesium anodes 16, electrolyte and carbon cathodes 15. Hydrogen is also produced through local reaction or "self-discharge" of some quantity $(y)M$ of the active metal with the water of the electrolyte. The electrical output of the local reaction is zero, since it is converted into heat in what can be considered a short circuited electrochemical reaction. The hydrogen liberated by this local reaction is collected together with that liberated from the main electrochemical reaction for common handling thereafter. The overall reaction for the first stage then, can be expressed as:

$$(1+y)M + (1+y)(n)H_2O = (1+y)M(OH)_n$$
$$+ (1+y)\left(\frac{n}{2}\right)H_2(gas) + nE_1F + heat$$

where

M is the electropositive metal employed and
n is its valance.
y is the ratio of the amount of active metal taking part in the local reaction to the amount of active metal taking part in the main electrochemical reaction.
$E_1$ is the voltage produced per cell.
F is the value of the Faraday (96,494 coulombs).

The hydrogen produced in the first stage is oxidized anodically to the hydrogen ion in the second stage 12 and subsequently reacted in the electrolyte therein through the mechanism of the porous walls 37 to form water with the hydroxyl ion produced in the electrolyte by the cathodic reduction of the oxygen fed to the stage 12. The above reaction takes place as described in British Patent 667,298 (1952) and electrical energy is generated. The overall reaction for the second stage therefore may be stated:

$$(1+y)\left(\frac{n}{2}\right)H_2 + (1+y)\left(\frac{n}{4}\right)O_2 = (1+y)\left(\frac{n}{2}\right)H_2O$$
$$+ (1+y)(n)E_2F + heat$$

where $E_2$ is the voltage produced. The actual overall reaction for both stages is then:

$$(1+y)M + (1+y)\left(\frac{n}{2}\right)H_2O + (1+y)\left(\frac{n}{4}\right)O_2$$
$$= (1+y)M(OH)_n + nE_1F + (1+y)nE_2F + heat$$

Thus on the premise of equal numbers of first and second stage cells, it is seen that, for an overall expenditure per first stage cell of $(1+y)$ gram-mols of the active metal of valence $n$, $$(1+y).\left(\frac{n}{2}\right) \text{ mols of water}$$

and $$(1+y).\left(\frac{n}{4}\right) \text{ mols of oxygen}$$

covering both the electrochemical and local reactions, a quantity of $n$ Faradays of electricity would be transferred in the first stage cell and $(1+y).(n)$ Faradays in the corresponding second stage cell. The respective total currents delivered by the cells of each type would be in the ratio of $n$ to $(n).(1+y)$, or 1 to $(1+y)$. However on the premise of equal currents per cell, the number of cells in the first and second stages, respectively, would perforce, be in the ratio of 1 to $(1+y)$.

Using the latter premise, operation of the first and second stages in series, electrically, may be effected by utilizing all the cells in both the first and second stages in series with one another, as shown in Fig. 2. Thus, a physical plant in which the first-stage group comprises N cells, into which equal numbers of chemical equivalents of the active metal are fed, respectively, has a second-stage group comprising $N(1+y)$, or $(N+Ny)$ cells, into which equal numbers of chemical equivalents of the hydrogen product of the first-stage reaction are fed, respectively. The total number of cells in series is therefore $2N+Ny$, with the product $Ny$ being an integer. Fig. 2 shows a series connection in accordance with the above equation having 3 cells in the first-stage and 5 in the second stage.

Further, in accordance with the invention, the rates of feed of the active metal, electrolytes, oxygen and hydrogen may be proportionately controlled in accordance with the current drawn by a load 60 connected across the system terminals (Fig. 2) by placing the field coils 61 of D.C. motors, e.g. 25 and the circulating pump and compressor motors, in series with the load whereby the speeds thereof can be varied accordingly. Circulation of the electrolyte in the first-stage also removes the anodic corrosion products, namely the metal hydroxide, not only from the surface of the anode, but also from the cell itself, through entrainment of the hydroxide by the electrolyte in the form of a suspension. Alternatively, the first stage electrolyte may be regenerated by separating the metal hydroxide externally of the cell either by filtering or centrifuging and by adding water to the same in the amount of $n$ molecular weight units per weight unit of the active metal.

In the above described system then, each stage is in itself a complete primary battery system from the viewpoint of electrical power generation. However the anodic and cathodic reacting materials, which may be supplied continuously at a controlled rate or intermittently as necessary are fed into the anode compartment of the first-stage and the cathode compartment of the second-stage. Thus, not only is a safely operable process provided whereby an active metal may be reacted with oxygen or atmospheric air but the energy efficiency is also higher than would be obtained by the direct electrochemical reaction of the metal with oxygen and water in a conventional single stage battery. This improvement in efficiency is accomplished by virtue of the fact that, in effect substantially all the active metal takes part in the electrochemical reaction and in the case of magnesium the improvement in material utilization can be as high as 66% over alternate methods.

Obviously many modifications and variations of the present invention are possible in the light of the above teachings. It is therefore to be understood that within the scope of the appended claims the invention may be practiced otherwise than as specifically described.

What is claimed is:

1. A method of generating useful electrical energy in a two stage primary battery system which comprises, reacting a strongly electropositive sacrifical metal anode with an aqueous electrolyte in the presence of a chemically inert cathode in a first stage of the system, to thereby generate electrical energy and liberate a reactant gas, conveying the hydrogen gas from the first stage of the system to a second stage thereof, electrochemically reacting the hydrogen gas from the first stage as the anode with oxygen as the cathode in an electrolyte in the second stage to thereby generate electrical energy in the second stage, and tapping electrical energy from each of the stages.

2. A method of generating electrical energy in a two stage primary battery system which comprises, continuously feeding a sacrificial metal as an anode into an aqueous electrolyte in the presence of an inert cathode in a first stage of the system to thereby generate electrical energy and liberate hydrogen in such first stage, conveying the hydrogen from the first stage to a second stage of the system for use as an anode therein, electrochemically combining the hydrogen with a oxygen in an electrolyte in the second stage to thereby generate electrical energy in said second stage, and tapping electrical energy from each of the stages.

3. A method of generating electrical energy in a two stage primary battery system which comprises continuously feeding a sheet of magnesium as an anode into sea water as an electrolyte in the presence of carbon as a cathode in a first stage of the system to thereby generate electrical energy and liberate hydrogen gas as a by-product of the electrochemical reaction, conveying the hydrogen gas from the first stage to a second stage of the system for use as an anode therein, feeding an oxygen-containing gas as a cathode and sea water as an electrolyte into the second stage of the system to thereby generate electrical energy in such second stage, and tapping electrical current from each of the two stages of the system.

4. A method of generating electrical current as set forth in claim 3 wherein the electrical energy is tapped from the first and second stages in series electrically, and wherein the rates of feed of the sheet magnesium anode and the sea water electrolyte into the first stage, hydrogen gas from the first to the second stage, and oxygen gas and sea water electrolyte into the second stage are proportionately controlled in accordance with current drawn from the system by a load connected across terminals thereof.

5. A two stage primary battery system comprising in combination means forming a first stage of the electropositive metal reactant type by reaction of the electropositive metal against an inert cathode in an aqueous electrolyte wherein electrical energy is generated and hydrogen is liberated, and a second stage of the type wherein electrical energy is generated by electrochemical reaction of two gases, means for conveying to the second stage hydrogen liberated in the first stage for electrochemical reaction with oxygen in such second stage, and means for tapping electrical energy from each of the two stages.

6. A two stage primary battery system as set forth in claim 5 wherein the first stage includes a first casing containing an electrolyte, an anode and a cathode, means for supplying a hydrogen-containing electrolyte to said casing and means for supplying to the casing an electropositive metal capable of liberating hydrogen when immersed in the electrolyte, and wherein the gas conveying means conveys liberated hydrogen from the casing to the second stage of the system.

7. A two stage primary battery system as set forth in claim 6 wherein the second stage includes a second casing having means therein for receiving hydrogen conveyed from the first stage, means for supplying an electrolyte to said second casing, and means for supplying an oxygen-containing gas to said second casing.

8. A two stage primary battery system as set forth in claim 7 wherein the means for tapping electrical energy from each of the two stages includes terminals connected for series flow of electrical energy and a load connected across such terminals.

9. A two stage primary battery system as set forth in claim 8 which includes means operated responsive to the load connected across the terminals of the system for proportionality controlling the supply of electrolyte and electropositive metal to the first stage, hydrogen gas from the first to the second stage, and electrolyte and oxygen-containing gas to the second stage.

10. A method of generating electrical energy in a two stage primary battery system which comprises, continuously feeding a sacrificial metal as an anode into an aqueous electrolyte in the presence of an inert cathode in a first stage of the system to thereby generate electrical energy and liberate hydrogen in said first stage, conveying the reactant gas from said first stage to a second stage of the system for use as an anode therein, and electrochemically combining the hydrogen with oxygen in an electrolyte in the second stage, to thereby generate electrical energy in said second stage.

11. A two stage primary battery system according to claim 1, but further characterized by means for removing the product of the reaction of said metal anode and said electrolyte from said first stage of said system whereby the efficiency of said reaction may not be reduced.

References Cited in the file of this patent

UNITED STATES PATENTS

| | | |
|---|---|---|
| 2,156,693 | Jacobson | May 2, 1939 |
| 2,570,543 | Gorin | Oct. 9, 1951 |
| 2,590,584 | Taylor | Mar. 25, 1952 |
| 2,716,670 | Bacon | Aug. 30, 1955 |

FOREIGN PATENTS

| | | |
|---|---|---|
| 8,906 | Great Britain | 1896 |
| 600,745 | Great Britain | Apr. 16, 1948 |